Aug. 18, 1959     L. G. ELLIS     2,900,037
SEISMOGRAPHIC EXPLORATION

Filed July 15, 1954     2 Sheets-Sheet 2

*INVENTOR.*
LACOSTE G. ELLIS
BY
Bussey, Smith & Hardin
ATTORNEYS

Aug. 18, 1959

L. G. ELLIS 2,900,037

SEISMOGRAPHIC EXPLORATION

Filed July 15, 1954

INVENTOR.
LACOSTE G. ELLIS

ATTORNEYS

2,900,037
SEISMOGRAPHIC EXPLORATION

Lacoste G. Ellis, Beaumont, Tex., assignor to Sun Oil Company, Philadelphia, Pa., a corporation of New Jersey Application July 15, 1954, Serial No. 443,477

1 Claim. (Cl. 181—.5)

This invention relates to seismographic exploration and has particular reference to the use of a vertical array of detectors receiving seismic waves from deep reflecting strata.

In ordinary reflection shooting an array of detectors is disposed over the surface of the earth and seismic waves reflected from earth strata pass upwardly through the earth to the detectors. These reflected waves in passing through the earth must, of course, pass through the weathered surface of the earth prior to their arrival at the detectors. Under certain conditions, such as when the weathered zone consists of gravel, caliche, glacial deposits or similar formations, the reflected waves are broken up by refraction, diffraction, reflection, etc. such that insufficient energy penetrates the weathered zone and reaches the detectors to give usable records.

It is an object of this invention to provide a vertical array of detectors positioned below the weathered layer which receive reflected waves and have their output signals recorded in the conventional fashion. Positioning the detectors below the weathered layer avoids the adverse effects noted above and positioning the detectors in a vertical array permits disposing the array in a single bore hole, thus avoiding the necessity for drilling a separate bore hole for each of the detectors as would be necessary if a horizontal array of detectors were positioned below the weathered layer.

The invention also contemplates the desirable use of a combination of a vertical array of detectors and the conventional horizontal array of detectors. When a horizontal array of detectors is used, the observed reflection times at each of the detectors must be corrected to a datum plane. These corrections cannot always be calculated accurately due to uncertainties as to the thickness of the weathered layer, its velocity, etc. When a vertical array of detectors is employed, the detectors can be quite accurately related in space to a datum plane.

It is a further object of the invention to accomplish seismic exploration by providing a vertical array of detectors in combination with a horizontal array of detectors in order that the displacement of the individual detectors of the horizontal array can be more accurately related to a datum plane.

These and subsidiary objects of the invention will become apparent from the following description when read in conjunction with the accompanying drawing in which.

Figure 1:
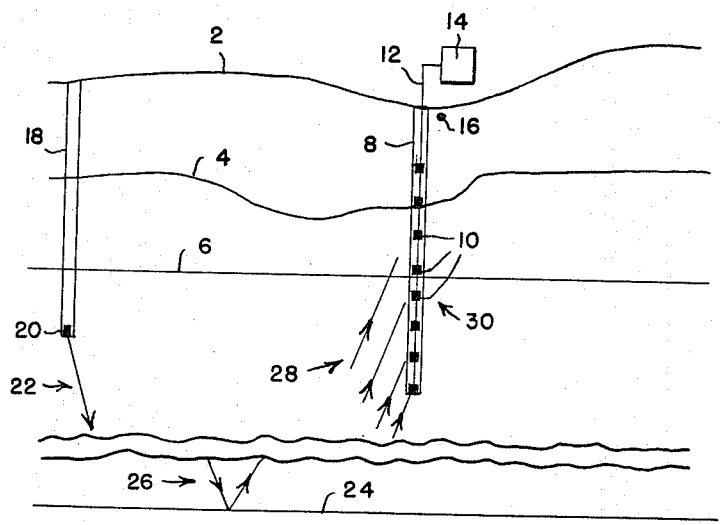
Figure 1 is a vertical section through the earth showing a vertical array of detectors as employed in accordance with the invention.

In Figure 1 there is shown at 2 the undulating earth surface, at 4 the lower boundary of the weathered layer, and at 6 a horizontal datum plane to which all data are corrected. In a vertically extending bore hole 8 there is positioned a vertically extending array of detectors 10. The bore hole 8 is of sufficient depth that at least several of the detectors will be below the lower boundary 4 of the weathered layer. The detectors are connected by means of a cable 12 to a conventional recording device 14. This recording device is preferably a magnetic type recorder in which the outputs from each of the detectors are simultaneously recorded on parallelly extending channels on a record tape in the conventional fashion.

A charge 20 is located near the bottom of a shot hole 18 spaced from the hole 8 and preferably extending to sufficient depth to position the charge below the weathered layer. Energy from the charge passes downwardly as indicated in a conventional fashion at 22 and is reflected from a reflecting horizon 24 as indicated at 26. The returning rays, indicated generally at 28, reach the detectors below the weathered layer with full energy as a result of the absence of any attenuation or distortion such as is involved when the reflected waves enter the weathered layer as noted above.

A small shot, as indicated at 16, is positioned just beneath the surface of the earth adjacent to the bore hole 8. By recording the outputs of the detectors 10 in response to the energy waves emanating from the shot 16, the vertical velocity of the seismic waves in both the weathered layer and in the subweathered layer in the vicinity of the detectors 10 can be determined. This shot will also give directly the time interval between arrivals at successive detectors for vertically travelling energy. It will be evident that with this information the record obtained from the detectors 10 of reflected energy from various subsurface strata can be interpreted. The various detector outputs resulting from reflections which arrive over a nearly vertical path can be identified in a manner similar to the identifications on the conventional record with a knowledge of the step-out time.

The technique of exploration described in connection with Figure 1 offers two primary advantages over the more conventional techniques. The first advantage is that the method of exploration yields an improved or more useable record in areas where, due to weathered layer conditions or conditions of the earth adjacent to the surface as discussed above, a poor quality of reflected waves arrives at surface detectors. The second primary advantage is that regardless of earth soil conditions and even where satisfactory records can be obtained by conventional methods, the method described will give records which can be more accurately interpreted. With the conventional methods of surveying in which a spread of detectors is positioned over the surface of the earth, the observed reflection times must be corrected to a datum plane. These corrections cannot always be calculated accurately due to uncertainties as to the thickness of the weathered layer, seismic velocity through the weathered layer and other similar factors. With the vertical array of detectors, the correct step-out time with respect to a datum plane can be simply and directly obtained from the record when the spread of detectors crosses the datum plane as indicated at 30 in Figure 1. If the spread of detectors does not cross the datum plane, then the correction can be calculated quite accurately inasmuch as the correction would be applied only to a travel path through the subweathered layer, the velocity of which in the vicinity of the vertical array of detectors can be accurately determined from the recording resulting from the firing of the shot at shot point 16.

Figure 2:
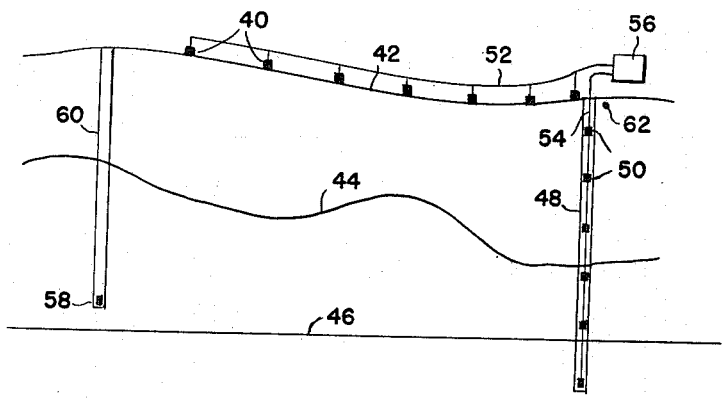
Figure 2 is a vertical section through the earth showing the combination of a horizontal array of detectors and a vertical array of detectors.

In Figure 2 there is shown at 40 an array of detectors positioned adjacent to the surface 42 of the earth. The lower boundary of the weathered layer is indicated at 44 and a datum plane to which all data are corrected is indicated at 46. In a bore hole 48 preferably extending below the datum plane 46 there is positioned a vertical array of detectors 50 with the array of detectors preferably, but not necessarily, crossing the datum plane 46. The detectors 40 and the detectors 50 are connected by means of cables 52 and 54, respectively, to a recorder 56. The recorder 56 is preferably a conventional type of magnetic recorder which serves to record the simultaneous output of each of the detectors in parallelly extending record traces. A shot point 58 is located at the bottom of a shot hole 60 displaced from the vertical array of detectors 50 and preferably positioned below the lower boundary 44 of the weathered layer. A shot point 62 is also provided adjacent to the upper end of the bore hole 48 for the purpose of determining the vertical velocities of both the weathered layer and the subweathered layer in the vicinity of the vertical array of detectors 50.

Figure 3:
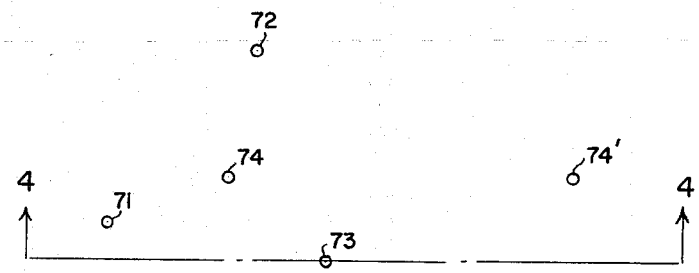
Figure 3 is a plan view showing three vertical arrays of detectors in three holes equidistantly spaced apart.
Figure 4:
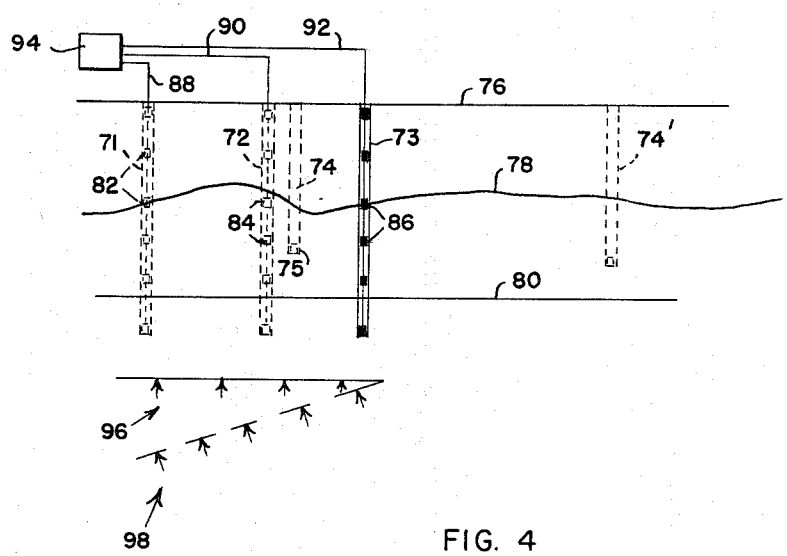
Figure 4 is a vertical section through the earth showing in vertical section the arrangement shown in Figure 3.

The combination of a horizontal array and a vertical array of detectors, as shown in Figure 2, represents the employment of conventional seismic exploration techniques in connection with the records obtained from the horizontal array of detectors 40 modified by the addition of a vertical array of detectors 50 for the purpose of following the times of arrival from the surface of the earth to the datum plane of reflections of events and calculating or observing these arrival times at the datum plane with greater accuracy by means of the information obtained from the records of the vertical array of detectors. In Figures 3 and 4 there is shown an arrangement involving three vertical arrays of detectors. Three bore holes 71, 72 and 73 are spaced equidistantly apart and extend downwardly from the surface 76 through the lower boundary of the weathered layer 78 and preferably through a datum plane 80. In each of the holes 71, 72 and 73 there is positioned a vertical array of detectors 82, 84 and 86, respectively. These detectors are connected by means of cables 88, 90 and 92, respectively, to a conventional recorder 94. A shot point 75 is positioned at the bottom of a shot hole 74 midway between the three bore holes 71, 72 and 73. It is noted that the shot point may also be positioned at a removed location such as at the bottom of a shot hole displaced from the three vertical arrays of detectors as indicated at 74'.

This arrangement permits the accurate determination of arrival times at a datum plane for three points in the plane in such a manner that the amount and direction of dip of a reflecting horizon can be accurately calculated. There is indicated at 96 in conventional fashion the wave fronts of reflected waves returning from a horizontal reflecting horizon. At 98 there is indicated the wave fronts of a reflected wave returning from an inclined reflecting horizon. When the shot is fired from shot point 75 equidistantly spaced from the three arrays of vertically extending detectors, the inclination or dip of the reflecting horizon can be calculated directly from the inclination of the reflected wave front. When the shot is removed from the location of the three vertical arrays of detectors, such as a shot positioned at the bottom of the shot hole 74', the normal dip of the wave front of the wave reflected from a horizontal reflecting horizon would have to be calculated and then, after arrival times of waves from an inclined reflecting horizon were corrected for this normal dip in the reflected waves, the direction and dip of a reflecting horizon can be calculated.

It will be evident from the foregoing that in each of the particular arrangements described the vertical array of detectors provides for accurate correlation of or correction of observed reflection time to a horizontal datum plane. The invention provides this correlation in conjunction with the use of both horizontally and vertically extending arrays of detectors as well as in conjunction with only vertically extending arrays of detectors.

What is claimed is:

A method of seismic exploration comprising providing a plurality of equi-distantly spaced vertical arrays of detectors in the earth, providing a source of seismic waves equi-distantly spaced from each of said arrays of detectors, detecting at said detectors seismic waves emanating from said source and reflected from earth strata below the array of detectors, and recording the simultaneous outputs of said detectors and determining direction and dip of a reflecting horizon by comparing said recordings.

References Cited in the file of this patent

UNITED STATES PATENTS

| | | |
|---|---|---|
| 1,240,328 | Fessenden | Sept. 18, 1917 |
| 1,909,205 | McCollum | May 16, 1933 |
| 2,276,306 | Hoover et al. | Mar. 17, 1942 |
| 2,276,335 | Peterson | Mar. 17, 1942 |
| 2,331,080 | Petty | Oct. 5, 1943 |
| 2,503,904 | Dahm | Apr. 11, 1950 |
| 2,596,463 | Barthelmes | May 13, 1952 |
| 2,712,124 | Ording | June 28, 1955 |
| 2,718,930 | Bazhaw | Sept. 27, 1955 |
| 2,792,067 | Peterson | May 14, 1957 |
| 2,792,068 | Peterson | May 14, 1957 |